United States Patent
Stevens et al.

(10) Patent No.: US 7,692,149 B1
(45) Date of Patent: Apr. 6, 2010

(54) OPTICAL SENSING

(75) Inventors: Rick C. Stevens, Apple Valley, MN (US); Firooz A. Sadjadi, St. Anthony, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 11/880,310

(22) Filed: Jul. 20, 2007

(51) Int. Cl.
  G01J 5/00 (2006.01)
  G01J 1/04 (2006.01)
  G02B 6/06 (2006.01)

(52) U.S. Cl. .............................. 250/338.1; 250/227.11; 250/227.2

(58) Field of Classification Search .............. 250/338.1, 250/234, 306, 227.2, 227.11
See application file for complete search history.

(56) References Cited

U.S. PATENT DOCUMENTS

| | | | |
|---|---|---|---|
| 4,441,817 A * | 4/1984 | Pryor | 356/615 |
| 4,656,349 A | 4/1987 | Pinson et al. | |
| 4,719,341 A | 1/1988 | Hoogenboom | |
| 5,032,023 A * | 7/1991 | Schneiter | 356/3.05 |
| 5,114,227 A | 5/1992 | Cleveland, Jr. | |
| 5,500,520 A | 3/1996 | Komine | |
| 6,163,372 A * | 12/2000 | Sallee et al. | 356/5.1 |
| 6,292,608 B1 * | 9/2001 | Toh | 385/43 |
| 6,507,017 B1 * | 1/2003 | Naaman et al. | 250/234 |
| 6,563,107 B2 | 5/2003 | Danisch et al. | |
| 6,915,955 B2 | 7/2005 | Jung et al. | |
| 7,429,734 B1 * | 9/2008 | Tidwell | 250/338.1 |
| 2001/0008269 A1 * | 7/2001 | Heffner et al. | 250/227.11 |
| 2001/0055441 A1 * | 12/2001 | MacKinnon | 385/16 |
| 2003/0016348 A1 | 1/2003 | Sallee | |
| 2004/0178329 A1 * | 9/2004 | Kare et al. | 250/227.11 |

OTHER PUBLICATIONS

Fischer, Baruch, et al. "Real-time three-dimensional imaging through fiber bundles by . . . ". Optics Letters, vol. 10, No. 4, Apr. 1985. pp. 182-183.
Harrington, James A. "Infrared Fiber Optics". OSA Handbook, vol. III, to be published by McGraw Hill. pp. 1-13.
McClain, Brian L., et al. "Optical Absorption and Fluorescence Spectral Imaging . . . ". Applied Spectroscopy, vol. 53, No. 9, 1999. pp. 1118-1122.
Walt, David. "Array Analysis". SPIE's OE Magazine, Feb. 2002. pp. 20-22.

* cited by examiner

*Primary Examiner*—David P Porta
*Assistant Examiner*—Faye Boosalis
(74) *Attorney, Agent, or Firm*—Brooks, Cameron & Huebsch, PLLC

(57) ABSTRACT

Embodiments of the present disclosure include systems, device, and methods of providing optical sensing. Various embodiment include an optical transmitting and receiving apparatus that can include an optical fiber bundle having an end located proximate to a lens and an aperture through which optical energy is received by the optical fiber bundle, and a sensor array, where the optical fiber bundle receives optical energy and passes the optical energy through the bundle to the sensor array, and where the sensor array is located remotely from the lens.

19 Claims, 6 Drawing Sheets

OPTICAL SENSING

FIELD OF THE DISCLOSURE

The present disclosure generally relates to optical communication. And, in particular, the present disclosure relates to optical sensing.

BACKGROUND

Optical sensing is used in a variety of applications. For example, optical sensing is often utilized in surveillance applications in vehicles such as aircraft, spacecraft, landcraft, and watercraft.

In such applications, it is often beneficial that an optical sensing apparatus or system produce high quality images. Additionally, an optical sensing apparatus or system that provides flexibility in the type of images that can be produced in the field and the ability to utilize a large field of view where imaging can take place can be useful features, in some instances.

In aircraft, for example, optical sensing can be used as part of the aircraft's imaging system and also can be used to produce viewable photo or video type images of the ground and/or the activities in the air and/or on the ground. Such optical sensing systems can, therefore, be multi-functional.

Such optical sensing systems can provide imaging through a broad spectrum of frequencies including wavelengths across the human visible and/or infrared spectrum, among other ranges. This allows for flexibility in the type of images that can be produced by the optical sensing system.

However, in order to provide such functionality, all or most of the imaging components are moved as the target of imaging is changed. In some applications, a vehicle may have space constraints or weight distribution issues that may make such movements difficult, undesirable, or impossible. Further, such components may be too large to provide a suitable operational cross-section field of view, in some applications.

SUMMARY

Embodiments of the present disclosure include systems, devices, and methods of providing an optical sensing system. Embodiments of the present disclosure can be utilized in surveillance applications in vehicles such as aircraft, spacecraft, landcraft, and watercraft, among other types of sensing applications. In embodiments of an optical sensing system for instance, the system can be used, for example, to sense optical images in a sensor array that is remotely located from the lens that captures the optical image.

Such embodiments can allow for more flexibility in designing one or more motion controllers that can be used to move the lens or optical components used to capture various optical images. Also, such embodiments allow for a centralized location to be utilized for the sensor array to process and manipulate image information. These features of the system are accomplished, for example, by using an optical fiber bundle to transfer image information from the lens to the sensor array.

For example, in some embodiments, an optical sensing system includes an optical transmitting and receiving apparatus. An optical transmitting and receiving apparatus can include, for example, an optical fiber bundle having an end located proximate to a lens and an aperture through which optical energy is received by the optical fiber bundle, and a sensor array, where optical energy received by the optical fiber bundle is passed through the bundle to the sensor array, and where the sensor array is located remotely from the lens. In some embodiments, the optical fiber bundle can be a coherent optical fiber bundle to allow the transfer of optical energy in a manner where the image can be preserved in the transfer through the various fibers of the bundle.

The optical energy utilized can be of any suitable type. For example, in various embodiments, the optical energy collected by the optical fiber bundle can be electro-optical energy visible by the unaided human eye. In some embodiments, the optical energy collected by the optical fiber bundle can be infrared optical energy.

Such embodiments can include an apparatus with a motion controller to adjust a position of the end of one or more optical fiber bundles in at least one dimension in three dimensional space. In embodiments having one or more lenses attached to the end of an optical fiber bundle, a motion controller can move the end of the optical fiber bundle and the lens. In embodiments having one or more lenses attached to the aperture, a motion controller can move an end of an optical fiber bundle without moving the lens.

In various embodiments, one or more sensor arrays can include a first sensor array having one or more electro-optical (EO) sensors. Some embodiments can include additional sensor arrays having one or more sensor types, such as infrared or electro-optical sensors.

Some embodiments can, for example, include an optical fiber bundle having a first optical fiber bundle that passes optical energy to a first sensor array and a second optical fiber bundle that passes optical energy to a second sensor array. Such embodiments can be beneficial, for example, for providing multiple sets of image information (e.g., images of different targets areas or different types of image information, such as infrared and visible image information).

In some embodiments, a method for operating an optical energy transfer system can include receiving optical energy in an optical fiber bundle, where the coherent optical fiber bundle is located in a lens with an aperture, and transferring the optical energy from the optical fiber bundle to a sensor array, where the sensor array is remotely located within a platform. In such embodiments, the end of the optical fiber bundle can be moved with one or more motion controllers (e.g., motors, etc).

Various embodiments of the present disclosure can include an optical sensing system with a housing, an optical fiber bundle, a lens, an aperture, and/or a sensor array located proximate to a platform. A platform can be a support structure that provides a frame and/or a shelf to mount various systems and components, such as electrical or mechanical systems, in a vehicle. A platform can be located anywhere throughout a vehicle and can be of any size necessary to support a system in a vehicle.

The platform is located remotely from the lens and the optical fiber bundle can receive optical energy and can pass the optical energy through the optical fiber bundle to the sensor array. Such embodiments can include an aperture through which optical energy is received by the optical fiber bundle and where the optical fiber bundle has an end located proximate to the lens and/or the aperture.

In some embodiments, a lens can be located on the surface of the housing. For example, a housing for an optical sensing system can be the exterior surface of an aircraft, such as a low observable aircraft, among other vehicle types. Such embodiments can include a motion controller to adjust a position of the end of the optical fiber bundle in at least one dimension in three dimensional space.

In some embodiments, the optical fiber bundle can be greater than 1 meter (m) in length. In embodiments having the optical fiber bundle greater than 1 meter in length, the optical fiber bundle can be remotely located from the lens more easily. This can allow more flexibility in the design of the optical sensing system by being able to locate the sensor array anywhere in a vehicle and also by increasing location and movement options for the lens.

Also, as discussed above, some embodiments can include a coherent optical fiber bundle. In some embodiments having a coherent optical fiber bundle, the image information can be transferred to the sensor array by the coherent optical fiber bundle with little or no loss of information or shift of the information in time.

In various embodiments, the sensor array can include different types of sensors. For example, some sensor arrays can have one or more electro-optical (EO) sensors and one or more infrared (IR) sensors, or other sensor types, and can receive different types of image information (e.g., EO or IR) from the coherent optical fiber bundle.

DETAILED DESCRIPTION

Figure 1:
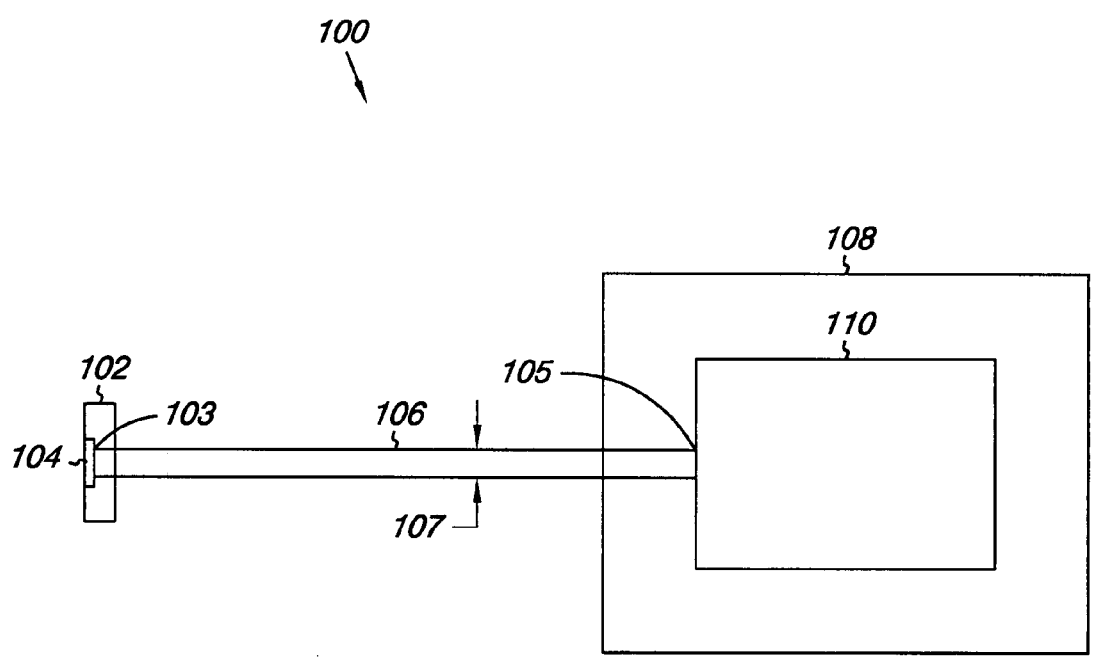
FIG. 1 is an illustration of an optical sensing system having an optical fiber bundle according to an embodiment of the present disclosure.

Embodiments of the present disclosure include systems, devices, and methods of providing an optical sensing system. Various embodiments include an optical transmitting and receiving apparatus that can include an optical fiber bundle having an end located proximate to a lens and/or an aperture through which optical energy is received by the optical fiber bundle, and a sensor array, where the received optical energy passes through the bundle to the sensor array, and where the sensor array is located remotely from the lens and/or aperture.

Embodiments of the present disclosure are described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

FIG. 1 is an illustration of an optical sensing system having an optical fiber bundle according to an embodiment of the present disclosure. The optical sensing system 100 shown in FIG. 1 includes an aperture 102, a lens 104, an optical fiber bundle 106, a platform 108, and a sensor array 110.

The optical sensing system 100 includes an optical fiber bundle 106 that can be a coherent optical fiber bundle. As used herein, the term "coherent" means aligned, wherein the fibers in a coherent optical fiber bundle are aligned throughout the length of the bundle, allowing the transfer of optical image data through the fibers with little or no loss of information or shift of the information either temporally or spatially.

The coherent nature of the optical fiber bundle 106 can, for example, allow the transmission of an image from a first end 103 of the optical fiber bundle 106 to a second end 105, for example, (i.e., from the lens 104 to the sensing array 110) in an embodiment of the optical sensing system 100 with little or no loss of information or shift of the information either temporally or spatially. Such embodiments may reduce the amount of image manipulation that has to be done after transmission of the information, in some instances.

The optical fiber, bundle in the optical sensing system embodiment of FIG. 1 allows for an image to be captured through the lens 104, via aperture 102, and passed through the optical fiber bundle 106 to the sensor array 110. In the embodiments of FIG. 1, the sensor array 110 is located remotely from the aperture 102 and/or lens 104. The sensor array's remote location can allow for more flexibility in the design of the optical sensing system 100 by being able to locate the sensor array 110 anywhere in a vehicle and also by increasing location options for the aperture 102 and/or lens 104 and movement options for the image collecting component (e.g., the collection end of fiber 106) and/or lens 104.

In various embodiments, the optical fiber bundle 106 can be positionable within the lens 104. For example, the lens 104 is connected to the optical fiber bundle 106 thus allowing the lens 104 and optical fiber bundle 106 to be positionable with respect to the aperture 102. In some embodiments, the lens and optical fiber bundle can be separate components that can be moved in unison or together by the same motion controller (e.g., servo motor).

In the embodiment illustrated in FIG. 1, the sensing array 110 is located on the platform 108. In some embodiments the sensing array can be proximate to or in the platform 108.

Platform 108 can be a support structure that provides a frame and/or a shelf to mount various systems and components, such as electrical or mechanical systems, in a vehicle. Platform 108 can be located anywhere throughout a vehicle and can be of any size necessary to support a system in a vehicle. The platform 108 can act as a mount for the sensing array 110 and the sensor array 110 can be fixed on the platform 108.

The remote nature of the sensing array 100 on the platform 108 allows an image to be captured by the lens 104 and be sent to a distant location, (i.e., the sensor array 110) by the optical fiber bundle 106. Once the image is received by the optical fiber bundle 106, the image can be further processed and/or manipulated by the electronics in and/or connected to the sensor array 110.

The sensor array 110 being located remotely from the lens 104 allows for more flexibility in the design parameters of the optical sensing system 100. One design parameter this configuration allows for is the optical fiber bundle 106, or optical fiber bundle 106 and lens 104, to be positionable as discussed herein.

The sensor array 110 being a remote distance from the lens 104 allows for the positioning of the optical fiber bundle 106 or optical fiber bundle 106 and lens 104 to capture images from a broader cross-section of the field of view as compared with movable camera type arrangements where all or many of the components of the optical sensing system are moved. This is accomplished by moving the end of the optical fiber bundle 106 and the lens 104, and not the sensor array 110 or the entire optical sensing system 100. In many embodiments, this allows for a much simpler positioning system, one that does not include gimballing the sensor array 110.

Another design parameter that is improved by this configuration is the size of the aperture 102. With the sensor array 110 being located remotely from the lens 104, the size of the aperture 102 utilized to allow the lens 104 to capture an image can be reduced.

Typically, the aperture 102 has to be big enough to allow the lens 104 to capture images in a cross-section that is adequate to capture the desired image. In some embodiments, the lens 104 can be approximately the size of the diameter 107 of the optical fiber bundle 106.

In such embodiments, the size of the aperture 102 can be dependent on the size of the optical fiber bundle 106. In some embodiments, the lens 104 can be fitted into the aperture 102. In some embodiments, the aperture 102 can have a domed or other suitably shaped cover (e.g., transparent to the wavelength and/or frequency of light to be collected) fitted into the aperture 102 where the lens 104 is inside of the cover.

Figure 2:
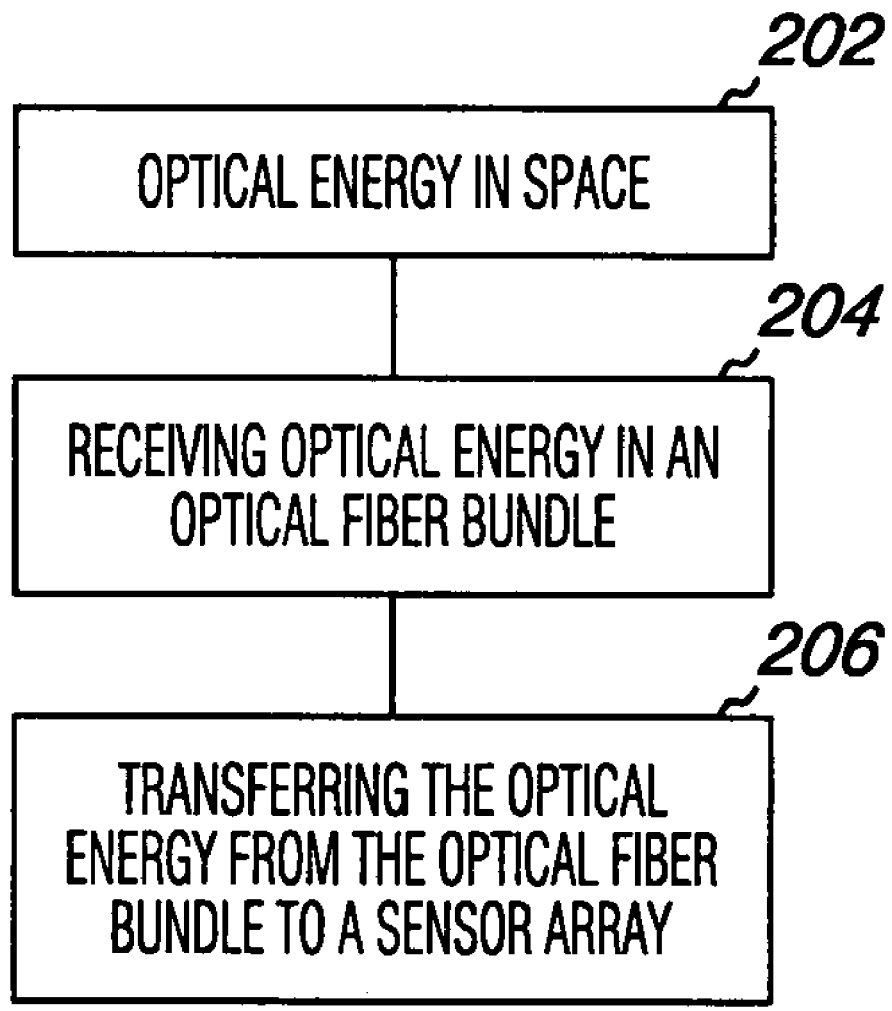
FIG. 2 is a block diagram illustrating a method of using an optical fiber bundle as part of an optical sensing system according to an embodiment of the present disclosure.

FIG. 2 is a block diagram illustrating a method of using an optical fiber bundle as part of an optical sensing system according to an embodiment of the present disclosure. FIG. 2 illustrates a method for receiving and transferring optical energy in an optical sensing system.

FIG. 2 illustrates that there is optical energy in space 202 that can be used for imaging at various frequencies and wavelengths. This optical energy is in the atmosphere or in space and can be part of the visible spectrum or from the infrared spectrum, among other spectral ranges. A portion of this optical energy is received by the optical fiber bundle and can be used to form the images that are transferred in the optical sensing system.

The optical sensing system can operate, for example, by receiving optical energy in an optical fiber bundle 204. The optical energy enters the optical sensing system through an aperture and lens that are part of the optical sensing system.

The aperture is an opening in a body, such as the fuselage or hull of an aircraft or other vehicle. The aperture is sized and positioned to allow the optical energy to enter the optical sensing system, so that the optical energy can be used to form the images for the applications using the optical sensing system. The aperture provides the access for the optical sensing system, specifically the optical fiber bundle, to the optical energy while protecting the optical sensing system from environmental conditions.

The lens can be part of the optical sensing system and can, in some embodiments, be used to focus the optical energy into the optical fiber bundle. In various embodiments, the lens can be connected to the optical fiber bundle, it can be independent of the optical fiber bundle and the aperture, or it can be connected to or part of the aperture. In such embodiments, the optical energy passes through the lens where it can be focused into the optical fiber bundle at one end of the optical fiber bundle.

In embodiments where the lens is connected to the optical fiber bundle, the lens and the optical fiber bundle can be positionable with respect to the aperture. This can allow the optical sensing system to receive optical energy from a wider cross-sectional field of view area than available with camera movable designs, which can be beneficial in many instances.

Such embodiments can also use positioning to select the source of the optical energy that is entering the optical sensing system, among other benefits. For example, this can be accomplished by moving the end of the optical fiber bundle within the lens or in conjunction with the lens within the aperture with a motion controller.

In embodiments where the lens is connected to the aperture, the optical fiber bundle is positionable within the lens. Such embodiments can also allow the optical sensing system to receive optical energy from a wide cross-sectional field of view area. Such embodiments can also use such positioning functionality to select the source of the optical energy that is entering the optical sensing system, among other benefits.

Optical sensing system embodiments also can operate by passing optical energy from an optical fiber bundle to a sensor array 206. A sensor array in an optical sensing system can be located remotely from the lens and/or aperture.

The optical energy that enters the optical sensing system through the lens is passed via the optical fiber bundle to the sensor array. The sensor array can process the optical energy into an image or other communication forms by the electronics associated with the sensor array.

The sensor array can be located remotely from the lens and/or aperture to allow more flexibility in the lens and/or aperture design by freeing the area around the lens and/or aperture from having the sensor array located proximate thereto. Also, a remotely located sensor array can be part of a centralized processing area, for example, in embodiments where multiple sources of optical energy are being brought to the sensor array through a series of lens, apertures, and/or optical fiber bundles.

FIGS. 3A, 3B, 3C, and 3D illustrate an optical sensing system with an optical fiber bundle and lens that is positionable within an aperture in an aircraft application according to an embodiment of the present disclosure. The optical sensing system shown in FIGS. 3A, 3B, 3C, and 3D illustrates the system within the fuselage 303 of an aircraft.

Figure 3A:
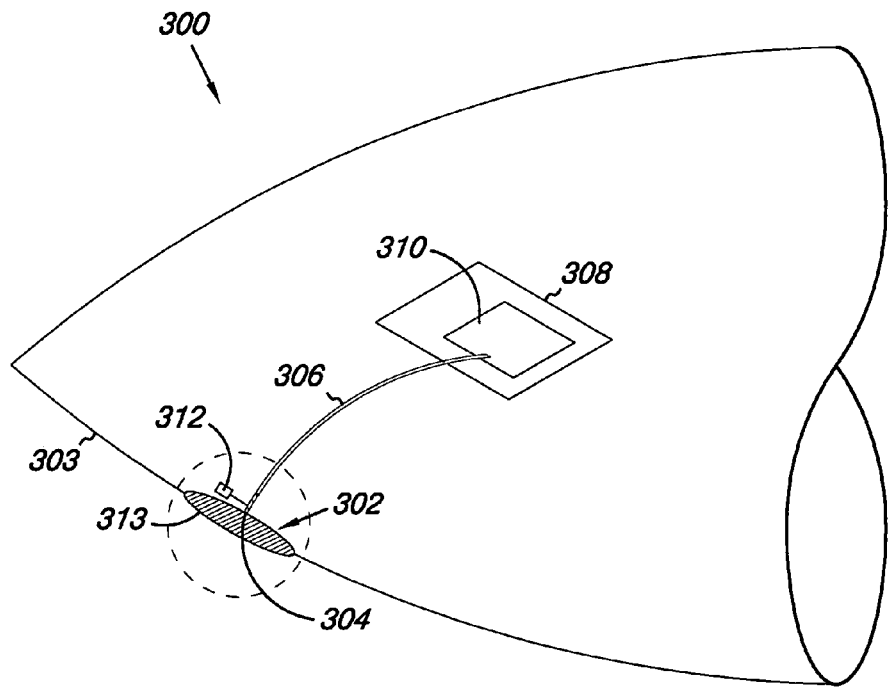
FIGS. 3A, 3B, 3C, and 3D illustrate an optical sensing system with an optical fiber bundle and lens that is positionable within an aperture in an aircraft application according to an embodiment of the present disclosure.

In the embodiment of FIG. 3A, the optical sensing system 300 has a sensor array 310 that is remotely located within the fuselage 303 of the aircraft. In the embodiment illustrated in FIG. 3A, the sensor array 310 is located on a platform 308.

In such embodiments, the sensor array 310 can be permanently fixed to the platform 308 or releasably attached to the platform 308. This releasibility can allow for flexibility in configuring the layout of the equipment on the platform 308.

The sensor array 310 has an optical fiber bundle 306 coupled to it. The optical fiber bundle 306 is utilized to transfer optical energy to the sensor array 310.

Figure 3B:
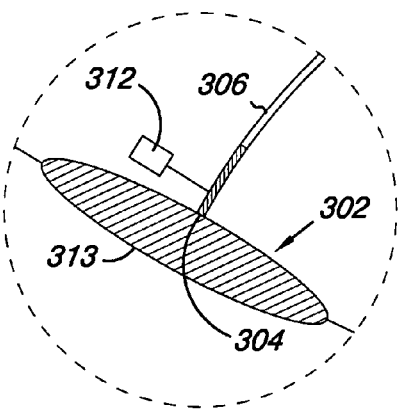

FIG. 3B is a close-up view of the surface of the fuselage 303 of the aircraft that contains the optical sensing system 300. The optical sensing system 300 has an aperture 302 on the surface of the fuselage of the aircraft.

On the inside of the aperture 302, a lens 304 is connected to the end of the optical fiber bundle 306. The lens 304 and the optical fiber bundle 306 are positionable within the aperture 302 by control device 312.

Control device 312 allows for the mechanical movement of the lens 304 and optical fiber bundle 306 within the aperture 302 to capture various images that are within the cross-section of the aperture 302. For example, a control device can include a movement mechanism (e.g., one or more motors and logic, such as a logic circuit or processor) to execute instructions to actuate the movement mechanism to move the lens and optical fiber bundle.

In various embodiments, such as those illustrated in FIGS. 3A-3D the aperture 302 can have a cover (e.g., partially or fully transparent to the wavelength or frequencies to be collected therethrough). The cover can be of any suitable shape (e.g., flat, domed, prism shaped, or cone shaped, among other shapes). Such shapes can also be utilized as a lens (e.g., lens 404 in embodiments such as 4A and 4B), in embodiments where the lens is not movable and/or not connected to the fiber bundle.

When utilizing a domed, prism, or other non-flat cover, in some embodiments, the field of view can be increased by positioning the end of the optical fiber bundle below the outer surface of the fuselage or hull of the vehicle.

For example, FIG. 3B illustrates a generally flat cover 313. In some embodiments, the cover can be curved, for example, to follow the shape of an outside surface of the vehicle fuselage or hull.

Figure 3C:
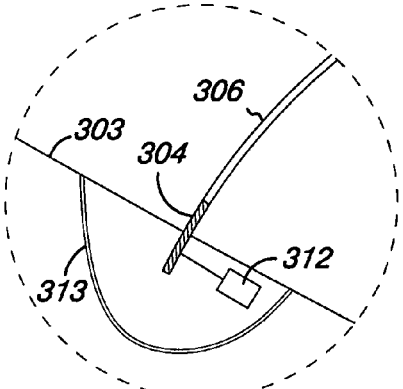
Figure 3D:
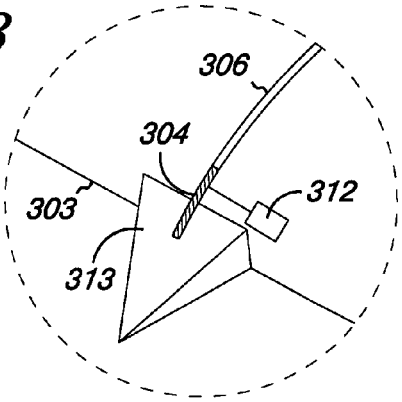

FIG. 3C illustrates an embodiment having a domed shaped cover 313. FIG. 3D illustrates an embodiment having a prism shaped cover 313.

As illustrated in such embodiments, the end of the fiber bundle 306 can extend into the space provided by the dome or prism shape, as can the control device and/or movement mechanism 312, in some embodiments. As illustrated in FIGS. 3B and 3D, the control device and/or movement mechanism 312 can be located within the fuselage 303 of the aircraft, in some embodiments. In other embodiments, as illustrated in FIG. 3C, the control device and/or movement mechanism 312 can be located in the space provided by the cover 313 (e.g., dome shape).

Figure 4A:
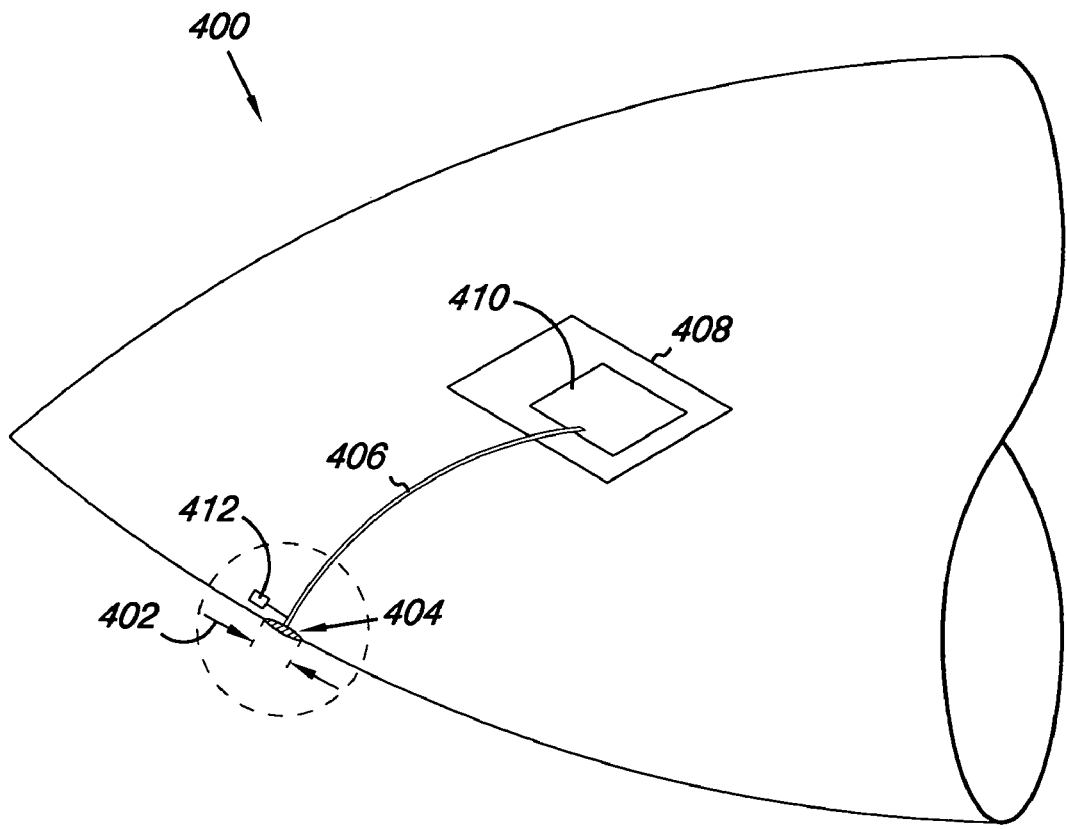
FIGS. 4A and 4B illustrate an optical sensing system with an optical fiber bundle that is positionable within a lens in an aircraft application according to an embodiment of the present disclosure.
Figure 4B:
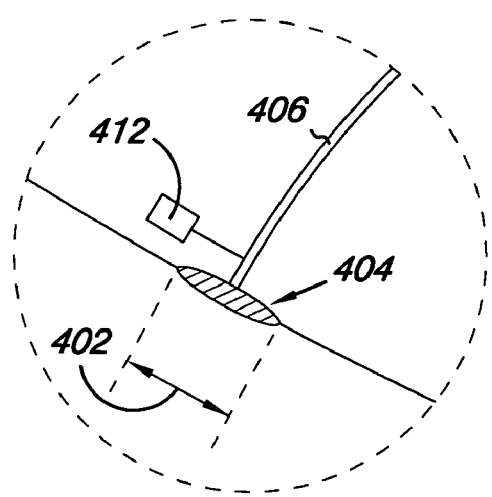

FIGS. 4A and 4B illustrate an optical sensing system with an optical fiber bundle that is positionable within a lens in an aircraft application according to an embodiment of the present disclosure. The optical sensing system shown in FIGS. 4A and 4B illustrates the system within the fuselage 403 of an aircraft.

As shown in the embodiment of FIG. 4A, the optical sensing system can have a sensor array 410 that is remotely located within the fuselage 403 of the aircraft. For example, the sensor array 410 can be located on platform 408 within the avionics bay of an aircraft, among other suitable remote locations.

The sensor array 410 has an optical fiber bundle 406 coupled to it or proximately positioned thereto. The optical fiber bundle 406 is used to pass optical energy to the sensor array 410.

FIG. 4B is a close-up view of the surface of the fuselage 403 of the aircraft that contains the optical sensing system 400. The optical sensing system 400 has an aperture 402 on the surface of the fuselage of the aircraft.

On the inside of the aperture 402, a lens 404 is connected to the aperture. The optical fiber bundle 406 is positionable with respect to the lens 404 and/or aperture 402 by control device 412. Control device 412 can be used to provide the mechanical movement of the optical fiber bundle 406 within the lens 404 to capture various images that are within the cross-sectional field of view of the aperture 402.

Figure 5:
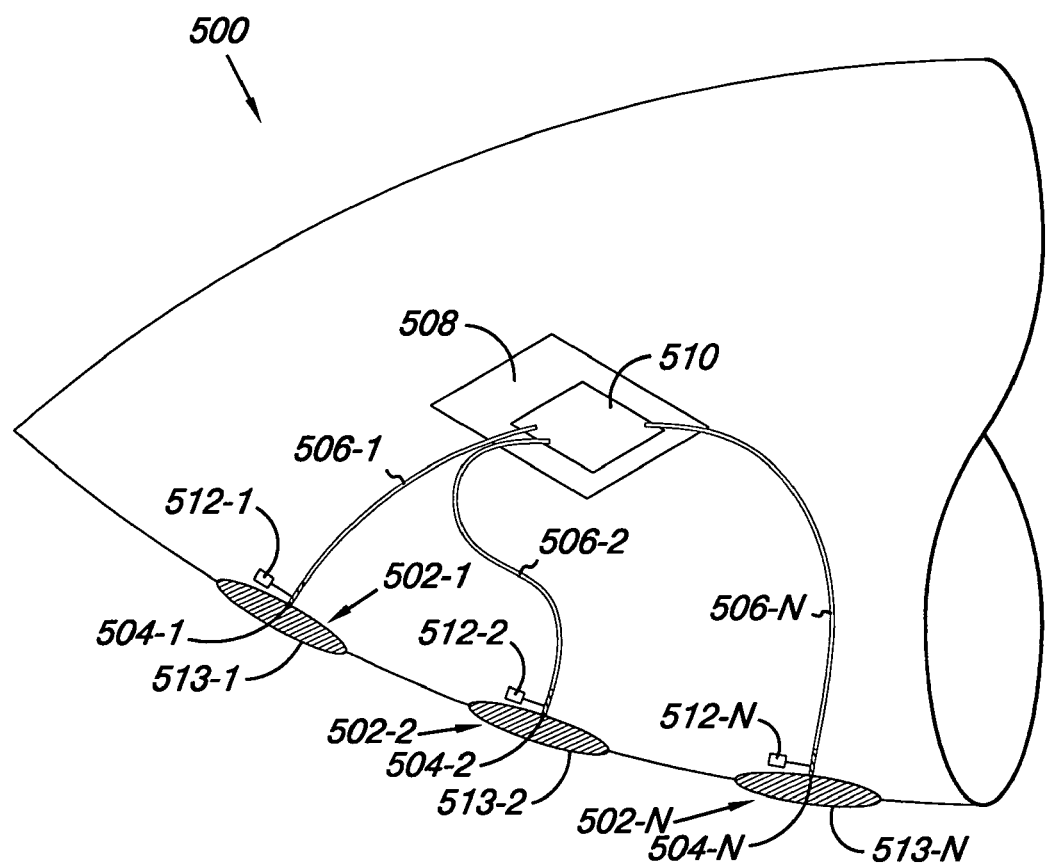
FIG. 5 illustrates an optical sensing system with a number of optical fiber bundles, lenses, and apertures that are connected to a sensor array in an aircraft application according to an embodiment of the present disclosure.

FIG. 5 illustrates an optical sensing system with a number of optical fiber bundles, lenses, and apertures that are connected to a sensor array in an aircraft application according to an embodiment of the present disclosure. The optical sensing system in FIG. 5 has a number of apertures, 502-1, 502-2, 502-N and lenses, 504-1, 504-2, 504-N that can be used to allow multiple images to be processed by the optical sensing system 500.

The aperture/lens combinations in the optical sensing system 500 can be located anywhere throughout the body of a vehicle (e.g., the fuselage of the aircraft). Each aperture/lens combination is associated with (e.g., aligned to pass optical energy) an optical fiber bundle, 506-1, 506-2, 506-N. The optical fiber bundles, 506-1 . . . 506-N, pass the optical energy, used to form images, to the sensor array 510, which is coupled to platform 508, in the embodiment of FIG. 5.

In the embodiment shown in FIG. 5, a single sensor array 510 is used to collect the images that are received by multiple lenses, 504-1 . . . 504-N, in the optical sensing system 500. In order to utilize the information from the multiple lenses, the sensor array 510 can contain one or more electro-optical (EO) sensors and/or one or more infrared (IR) sensors.

In some embodiments, this can, for example, allow the optical sensing system 500 to use optical energy from the visible optical spectrum and/or the infrared spectrum. In some embodiments, logic can be provided to select which image information to use or to process the image information (e.g., crop, stitch, or provide a composite of multiple images and/or image formats). Also, the multiple optical fiber bundles, 506-1 . . . 506-N, coupled to the sensor array 510 can allow an optical sensing system to provide multiple images while processing the images utilizing a single sensor array 510.

Figure 6:
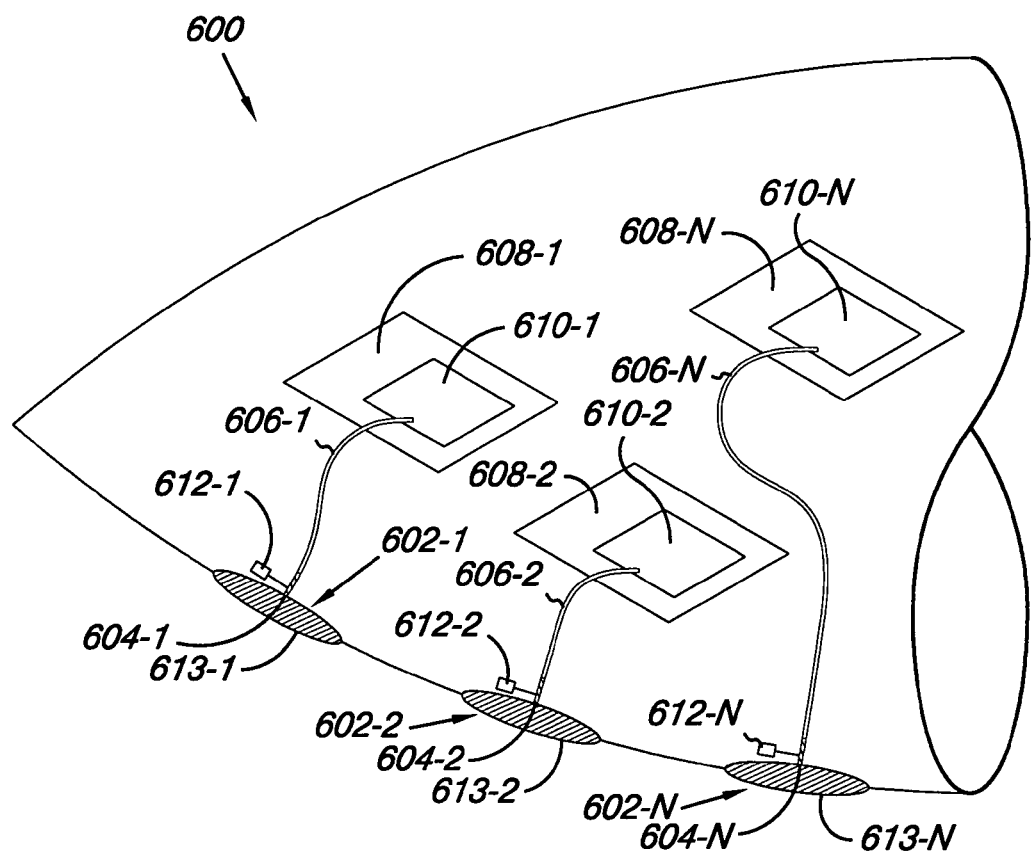
FIG. 6 illustrates an optical sensing system with a number of optical fiber bundles, lenses, and apertures that are connected to a number of sensor arrays in an aircraft application according to an embodiment of the present disclosure.

FIG. 6 illustrates an optical sensing system with a number of optical fiber bundles, lenses, and apertures that are connected to a number of sensor arrays in an aircraft application according to an embodiment of the present disclosure. The optical sensing system in FIG. 6 has multiple apertures, 602-1, 602-2, 602-N and lenses, 604-1, 604-2, 604-N that allow multiple image information to be collected by the optical sensing system 600.

As in the embodiment of FIG. 5, the aperture/lens combinations in the optical sensing system 600 can be located anywhere throughout the body of a vehicle (e.g., the fuselage of the aircraft). Also, similar to the embodiments of FIG. 5, each aperture/lens combination is associated with an optical fiber bundle, 606-1, 606-2, 606-N. The optical fiber bundles, 606-1 . . . 606-N, pass the optical energy that form images to the sensor arrays, 610-1, 610-2, 610-N, which are coupled to a number of platforms, 608-1, 608-2, 608-N.

In the embodiment shown in FIG. 6, multiple of single sensor arrays, 610-1 . . . 610-N, are used to collect the images that are received by multiple lenses, 604-1 . . . 604-N, in the optical sensing system 600. In order to utilize the information from the multiple lenses, the sensor arrays, 610-1 . . . 610-N, can contain one or more electro-optical (EO) sensors and one or more infrared (IR) sensors.

Also, the multiple optical fiber bundles, 606-1 . . . 606-N, associated with the sensor arrays, 610-1 . . . 610-N, can allow an optical sensing system to provide multiple images while processing the images utilizing one or more sensor arrays, 610-1 . . . 610-N. The sensor arrays, 610-1 . . . 610-N, can be located throughout the fuselage of the aircraft, thus, allowing the optical sensing system 600 to be operational even if an area of the fuselage becomes damaged and a sensor array in that area becomes inoperable, among other benefits.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. An optical transmitting and receiving apparatus, comprising:
   an optical fiber bundle having an end connected to a lens and an aperture through which optical energy is received by the lens and the optical fiber bundle;
   a sensor array, where the optical fiber bundle receives optical energy and passes the optical energy through the bundle to the sensor array, and where the sensor array is located remotely from the lens and is in a fixed position; and
   a motion controller to adjust a position of the end of the optical fiber bundle connected to the lens in at least one dimension in three dimensional space while the sensor array remains fixed with respect to the end of the optical fiber bundle connected to the lens.

2. The apparatus of claim 1, where the optical energy collected by the optical fiber bundle is electro-optical energy visible by the unaided human eye.

3. The apparatus of claim 1, where the optical energy collected by the optical fiber bundle is infrared optical energy.

4. The apparatus of claim 1, where the motion controller can move the end of the optical fiber bundle and the lens.

5. The apparatus of claim 1, where the lens is attached to the aperture.

6. The apparatus of claim 1, where the optical fiber bundle is positionable within the lens.

7. The apparatus of claim 6, wherein the aperture of the lens is less than 10 millimeters (mm) in diameter.

8. The apparatus of claim 1, wherein the sensor array has one or more electro-optical (EO) and infrared (IR) sensors.

9. The apparatus of claim 1, where the optical fiber bundle is a first coherent optical fiber bundle that passes optical energy to the first sensor array and where the apparatus includes a number of coherent optical fiber bundles that each pass optical energy to the sensor array.

10. The apparatus of claim 1, wherein the sensor array is a first sensor array having one or more electro-optical (EO) and infrared (IR) sensors and where the apparatus includes a number of sensor arrays each having one or more electro-optical (EO) and infrared (IR) sensors.

11. The apparatus of claim 1, where the optical fiber bundle is a first coherent optical fiber bundle that passes optical energy to the first sensor array and where the apparatus includes a number of coherent optical fiber bundles that each pass optical energy to the number of sensor array.

12. A method for operating an optical energy transfer system, comprising:
   receiving optical energy in an optical fiber bundle, wherein the optical fiber bundle is located in a lens with an aperture;
   transferring the optical energy from the optical fiber bundle to a sensor array; wherein the sensor array is remotely located within a platform in a fixed position; and
   adjusting a position of an end of the optical fiber bundle located in the lens in at least one dimension in three dimensional space while the sensor array remains fixed with respect to the end of the optical fiber bundle located in the lens.

13. The method of claim 12, where method includes moving the end of the optical fiber bundle located in the lens with a motion controller.

14. An optical sensing system, comprising:
   a housing;
   an optical fiber bundle;
   a lens where the lens is located on the surface of the housing;
   an aperture through which optical energy is received by the optical fiber bundle, where the optical fiber bundle has an end connected to the lens and where the lens is located proximate to the aperture that is also located on the surface of the housing;
   a sensor array located proximate to a platform in a fixed position where the platform is located remotely from the lens, and where the optical fiber bundle receives optical energy and passes the optical energy through the bundle to the sensor array; and
   a motion controller configured to adjust a position of the end of the optical fiber bundle connected to the lens in at least one dimension in three dimensional space while the sensor array remains fixed with respect to the end of the optical fiber bundle connected to the lens.

15. The system of claim 14, where the housing is an aircraft.

16. The system of claim 15, where the aircraft is a low observable (LO) aircraft.

17. The system of claim 14, where the optical fiber bundle is greater than 1 meter (m) in length.

18. The system of claim 14, wherein the sensor array includes one or more electro-optical (EO) sensors and one or more infrared (IR) sensors.

19. The system of claim 14, where the optical fiber bundle is a coherent optical fiber bundle.

* * * * *